(12) United States Patent
Costa et al.

(10) Patent No.: US 11,094,431 B2
(45) Date of Patent: *Aug. 17, 2021

(54) METHODS AND SYSTEMS FOR SECURELY ACCESSING AND MANAGING AGGREGATED SUBMARINE CABLE SYSTEM INFORMATION

(71) Applicant: Global Broadband Solutions, LLC, Leesburg, VA (US)

(72) Inventors: Kathryn Costa, Leesburg, VA (US); Glenn Ericksen, Chester, NY (US); Theresa Linson, Dallas, TX (US); Nicholas Koopalethes, Leesburg, VA (US); Donald B. Yowell, Leesburg, VA (US); R. Bruce Morris, Riverside, RI (US); James Reidenbach, Frederick, MD (US); Jason Skinner, Prosper, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/713,374

(22) Filed: Dec. 13, 2019

(65) Prior Publication Data

US 2020/0303089 A1    Sep. 24, 2020

Related U.S. Application Data

(63) Continuation of application No. 16/358,674, filed on Mar. 19, 2019, now Pat. No. 10,510,465.

(51) Int. Cl.
*H01B 7/14* (2006.01)
*H04L 29/06* (2006.01)
*H02G 1/10* (2006.01)

(52) U.S. Cl.
CPC ............... *H01B 7/14* (2013.01); *H02G 1/10* (2013.01); *H04L 63/0815* (2013.01)

(58) Field of Classification Search
CPC ......... H01B 7/14; H02G 1/10; H04L 63/0815
USPC ............................................................ 340/6.1
See application file for complete search history.

(56) References Cited

U.S. PATENT DOCUMENTS

| | | | |
|---|---|---|---|
| 7,047,114 B1* | 5/2006 | Rogers | G08G 3/02 340/438 |
| 10,360,408 B1* | 7/2019 | Kincaid | G06F 21/577 |
| 2002/0053020 A1 | 5/2002 | Teijido | |
| 2002/0129354 A1* | 9/2002 | Bryan | G06Q 10/10 717/176 |
| 2005/0003765 A1* | 1/2005 | Alfano | H04W 48/18 455/67.11 |
| 2015/0200967 A1 | 7/2015 | Redlich et al. | |
| 2017/0374070 A1 | 12/2017 | Shah et al. | |
| 2018/0365424 A1 | 12/2018 | Callaghan et al. | |
| 2019/0236477 A1* | 8/2019 | Huang | G01M 3/24 |
| 2019/0238801 A1* | 8/2019 | Boyless | H04N 7/183 |

* cited by examiner

*Primary Examiner* — Omar Casillashernandez
(74) *Attorney, Agent, or Firm* — Capitol Patent & Trademark Law Firm, PLLC

(57) ABSTRACT

Aggregated, submarine cable system information is securely stored, accessed and managed. Security is assured through the use of multi-factor authentication that is compliant with National Institutes of Standards And Technology and US. Government Defense Federal Acquisition Regulation requirements. Further, real-time audit logs are generated as end-users access controlled unclassified information.

20 Claims, 1 Drawing Sheet

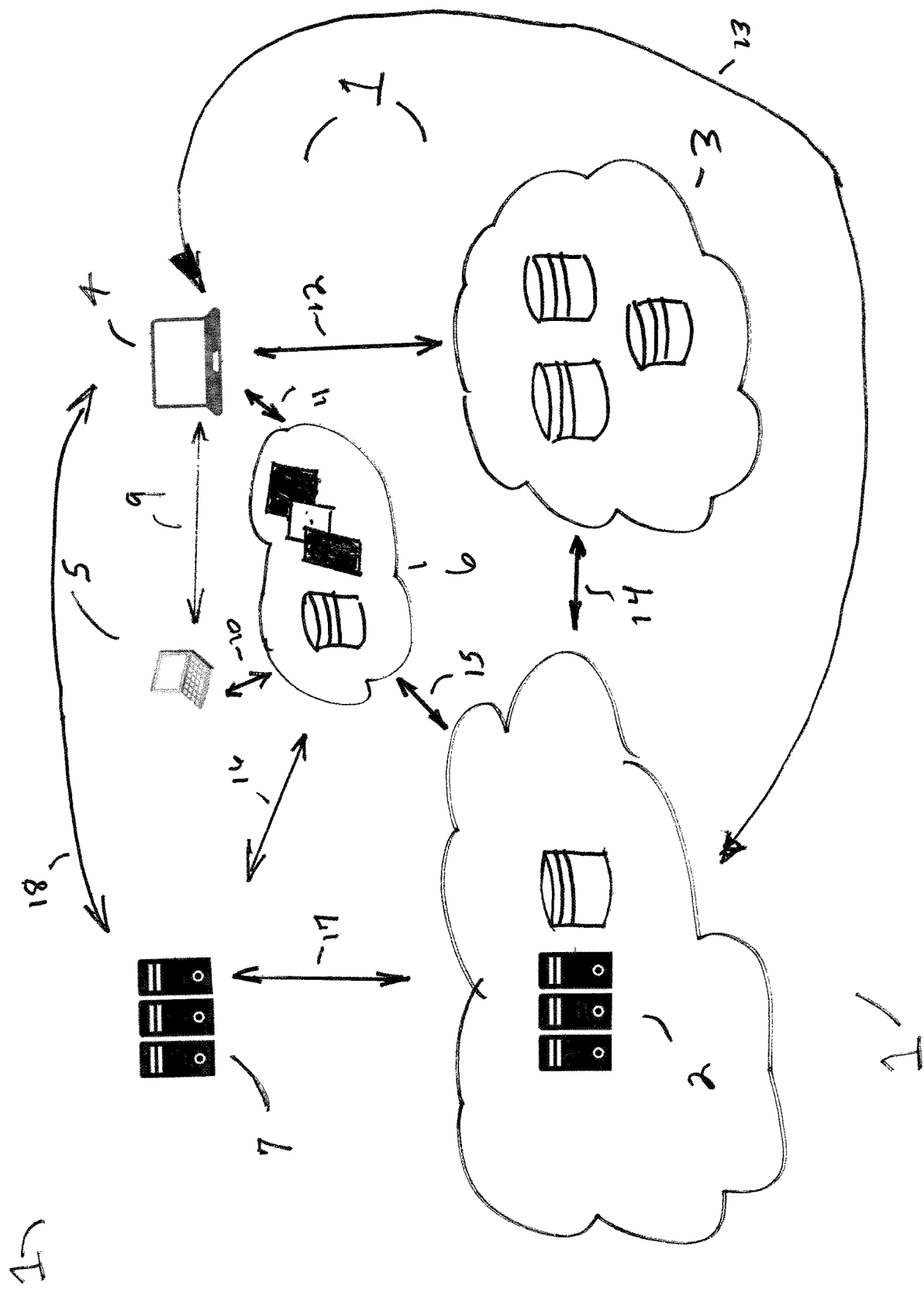

METHODS AND SYSTEMS FOR SECURELY ACCESSING AND MANAGING AGGREGATED SUBMARINE CABLE SYSTEM INFORMATION

RELATED APPLICATION

This application is a continuation of U.S. patent application Ser. No. 16/358,674 filed Mar. 19, 2019 (the "'674 Application") and claims priority to the '674 Application. This application incorporates the entire disclosure of the '674 Application as if it were set forth in full herein.

INTRODUCTION

This section introduces aspects that may be helpful to facilitate a better understanding of the described invention(s). Accordingly, the statements in this section are to be read in this light and are not to be understood as admissions about what is, or what is not, in the prior art.

The planning, design, construction and operation of a submarine cable system (hereafter "SC System") requires years of preparation and execution. It typically involves studies, reports, presentations and detailed documentation at each milestone as the system is being built, placed into operation, user tested and thereafter operated.

During the construction of an SC System, from inception to design to delivery, laying and testing for benchmarking reasons a submarine cable requires the generation, processing and storage of a substantial amount of information that is accumulated over time, all of which must be organized and managed for later usage to ensure proper construction and operation of an SC System. Further, all of this information must be retained for the life span of an SC System, which is generally at least twenty-five years based on the typical life span of the cables involved.

Many owners and operators of SC Systems do not understand how to manage or organize information related to their SC Systems or realize how such management and organization can lead to improved construction and operation of their SC Systems which, in turn, may result in millions of dollars of savings and a reduction of countless hours of personnel time.

Accordingly, it is desirable to provide methods and systems to improve the management and organization of SC System information.

In more detail, in order to determine a route or path (collectively "route") over which a submarine cable may be laid, a Comprehensive Desktop Study (DTS) is typically completed. A DTS is an intricate, "information-rich" process which maps out one or more potential routes. The information included in a DTS typically relates to technical research, environmental factors, system cost projections, installation liabilities, detailed nautical and bathymetric maps, charts, site survey reports, geological information, spreadsheets, photographs, videos and other information that will be needed for the life span of the cable. Often information related to a DTS may be distributed among multiple locations, and may be outdated, incomplete, partial or missing altogether.

Following the DTS, a permitting process begins. In order to lawfully prepare for the construction of a SC route, permits from various government agencies (United States and other countries), as well as from oil, gas and other utilities must be obtained. This typically requires a number of feasibility studies to be conducted. Such studies typically result in the generation of information "logs" for each country, where such logs and associated permits must be filed accurately. Many of these logs and other detailed, informational records must be kept for more than two decades. As a cable route is planned, designed and constructed, every detail must be recorded and stored. Thereafter, SC operators, construction and operational contractors, technicians, funding sources, legal authorities, and, at times, national governments must be able to access, manage and review such SC System information, including accessing and reviewing historical information and current route information (e.g., points making up a route are accurately plotted and updated).

When it comes time for an actual cable (or cables) to be laid on the ocean floor, a Marine Route Survey (MRS) is conducted. The MRS verifies or adjusts information from the DTS and indicates the current, best route for cable installation/laying. Typically, an MRS uses all of the information from the DTS and adds critical inputs including the final route position list (RPL), Cable Route Engineering (CRE), burial assessment, current subsea environmental conditions (for example, bathymetric information; seabed profiles; sub-bottom profiles; magnetometer survey information; core-sampling; endangered and protected coral, flora and marine life species; unexploded ordinance; ship wrecks; pipelines) and other hazards to provide comprehensive data, information and analysis so that the likelihood that the submarine cable can be safely installed along the planned cable route. The MRS is also required to finalize the system permitting process for final permit approval. Further, it is vitally important that before cables are manufactured or laid/installed, operated, maintained or repaired that all DTS and permitting information should be quickly accessible to numerous personnel located in many, different geographic locations. Typically, at this stage of the process, existing methods and systems do not provide cable owners and operators with effective means to access, manage and understand the large amount of critically important information in a timely manner (e.g., in real-time) because, for example, such information has been generated and stored in various locations using varied, different formats and storage techniques and is only accessible using a diverse number of differing techniques as well.

Accordingly, it is further desirable to provide methods and systems to improve the accessibility, management and user usability (i.e., user-friendliness) of SC System information, especially if there are US government storage and access requirements from the National Institute of Standards & Technology (NIST).

There remains a number of additional phases in the construction of an SC System. One such phase is an engineering phase. For example, CRE is based on the outputs of the DTS and MRS, and provides the foundation for the final RPLs and straight-line diagrams (SLDs) to be generated. This type of information includes detailed descriptions and data related to the cable route that has been selected during previous phases, including the cable "plant" (e.g., information related to the cable type, model number, location, size, weight, operating parameters and characteristics, etc., of the optical, electrical, electro-optical, mechanical, electro-mechanical, chemical and electro-chemical elements of the SC System, and data regarding cable branching units, repeaters, joints, beach manholes, cable lengths, armor types, transitions, slack, water depths, environmental factors, obstructions, cable and pipeline crossing points and maritime boundaries) that define the manufacturing and installation requirements of an SC System.

Today, given the fact that the owner of a SC System is required to store, maintain and ensure access to the information discussed above (among other information), and given the sheer volume of such information, existing SC owners (and operators) face a daunting challenge to meet such requirements. As mentioned briefly above, complicating matters further is the fact that many SC Systems involve the interaction of dozens of teams of personnel, each with ability to revise key information related to an SC System. This heightens the possibility, and the associated risks, that errors may be made and introduced into the SC System information (e.g., either by erroneously entering and storing inaccurate or incorrect information or, alternatively, by failing to enter updated, more accurate information). For example, work (e.g., undersea work) may be initiated or completed at an incorrect location due to a lack of accurate or updated maps or data. In the past, such errors have led to ships, involved in the construction, maintenance or repair of an SC System, having been loaded with the incorrect elements (e.g., optical or electrical cable). Yet further, such errors have led to repairs that have been made at the incorrect location or on the incorrect cables (e.g., on out-of-service cables). Sometimes, correct cables that are working properly have been unnecessarily or accidentally cut due to, for the most part, reliance upon inaccurate information. One international SC company keeps a database of over 4000 historical cable faults, a number of which have occurred as a direct result of reliance upon inaccurate information (e.g., having poorly managed SC informational records).

Still further, the time it takes to locate accurate, as-built SC System installation information during a weather-related emergency or in the event of human error (i.e. fishing boat anchor causing a cable fault, etc.) is an important factor in determining the extent to which an owner or operating company may lose large amounts of revenue or profits due to the need to replace miles of cable.

Accordingly, it is yet further desirable to provide secure and remotely accessible methods and systems for providing near real-time or real-time access to, and near real-time or real-time transmission of, SC System information during a weather-related emergency or in the event of human error.

As mentioned previously, typically the design, construction/installation, operation and maintenance of an SC System involves many people (e.g., owners, manufacturers of SC elements, installation and maintenance teams, company management, government representatives/employees, agencies, contractors, vessel operators, divers, engineers, technicians, inspectors, advisors, and other experts) during the life cycle of an SC System. Each of these individuals (or entities) may (most likely will) interact with the SC System information, and, therefore potentially access, change, retrieve, input or output (i.e., write, type, print, save, email, and/or copy) any of the SC information.

Accordingly, it is yet further desirable to provide methods and systems for monitoring and limiting access to (where and when appropriate) SC System information.

The personnel who may be involved in a particular SC System may change frequently. For example, once an installation team has completed their work, they may move on to other tasks or processes or leave the SC project altogether. In fact, sometimes the personnel that maintains an SC System is different than the personnel that designed, constructed and installed the SC System. Thus, the information relied upon during installation is often stored in locations known only to the installation personnel. As a result, maintenance personnel may spend unnecessary time and effort and expend unnecessary expenses in locating the stored information (let alone locating the previous personnel involved in generating and storing the information).

Accordingly, it is desirable to provide methods and systems for easily locating and accessing securely stored SC information (e.g., creation of an easily accessible central information repository), including the identity and contact information of previous personnel. For example, it is desirable to create a central repository that stores information that is necessary to satisfactorily address needed repairs, system upgrades, or maintenance to an SC System that can be accessed by world-wide personnel in near real-time or real-time, thereby minimizing delays and related expenses.

Additional desirable methods and systems for SC System owners and operators will be apparent from the detailed description set forth elsewhere herein.

SUMMARY

The inventors disclose various systems, devices and related methods that may be used to securely access and manage aggregated SC System information. The inventors describe exemplary embodiments where, for example, inventive physical systems, sub-systems and methods: (i) aggregate substantially all SC System information for secure access and management; (ii) incorporate the technology and architecture required to be in compliance with, and conform to NIST and federal standards for accessing and handling Controlled Unclassified Information (CUI) including, but not limited to, the information security guidance in NIST Special Publication 800-171 entitled "Protecting Controlled Unclassified Information in Non-Federal Information Systems and Organizations"; NIST Handbook 162 NIST MEP "Cybersecurity Self-Assessment Handbook For Assessing NIST SP 800-171 Security Requirements in Response to DFARS Cybersecurity Requirements" (i.e., an assessment based on NIST Special Publication 800-171) see https://nvlpubs.nist.gov/nistpubs/hb/2017/nist.hb.162.pdf) and Defense Federal Acquisition Regulation (DFAR) cybersecurity rules and clauses found at http://www.acq.osd.mil/dpap/dars/dfars/html/current/204_73.htm; (iii) provide tiered levels of access to SC System information that allows end-users to authorize specific personnel access to specific information; (iv) unlike existing "cloud-based" systems, provide for near real-time or real-time monitoring of SC Systems from an independent Security Operations Center (SOC) to ensure the safety of the stored SC System information; and (v) are operable to manage all of the various, different information file types used to create, modify and store SC System information (e.g., crossing agreements, spares inventory and inventory control, current day site inspections, evaluations and trouble ticket storage and control documents, operational, installation, maintenance & repair logs, spreadsheets, meeting minutes, maps, photos, videos, images and other SC documentation).

More particularly, embodiments of the invention are directed at an architecture for providing end users with the ability to securely access and manage aggregated SC system information, where the architecture may comprise: an information management sub-system; an SC information storage sub-system; an SC System administrative sub-system; a multi-factor authentication (MFA) sub-system, and a remote data monitoring and protection sub-system. Yet further, the architecture may comprise one or more end-user devices.

In a further embodiments (i) the SC information storage sub-system may comprise a centralized electronic repository of the SC system for aggregated, storing SC system information, (ii) the information remote data monitoring and protection sub-system may comprise a security operations center (SOC), (iii) the MFA sub-system may be operable to enable completion of multi-factor authentication compliant with National Institutes of Standards And Technology (NIST) and US. Government Defense Federal Acquisition Regulation requirements to access the aggregated, SC system information, and (iv) at least the information management sub-system and the SC information storage sub-system may be operable to generate a real-time audit signal or message each time a communication occurs or a connection is established between an end-user device and the information management sub-system and the SC information storage sub-system, respectively.

The aggregated SC system information may comprise construction information, operational information, DTS information, permits, feasibility studies & related logs, historical and current cable routes, maps, MRS information, engineering information, cable plant information, maintenance information, cable fault information, as-built system installation information, personnel information, and audit trail information, for example.

In a further embodiment the SC information storage sub-system may be configured as a structure that comprises multiple, end-user configurable hierarchical layers of information, where a first layer comprises a plurality of distinct images, where each image may represent a type SC System information, a second layer comprises a plurality of sets of information that, collectively, may be represented by one image in the first layer and a third layer comprises divided sets of information from the second layer.

In addition to the inventive architectures and sub-systems, the present invention also provides related methods for providing end users with the ability to securely access and manage aggregated SC system information. One such method may comprise: enabling completion of multi-factor authentication compliant with National Institutes of Standards And Technology (NIST) and US. Government Defense Federal Acquisition Regulation requirements to access aggregated, SC system information stored within an architecture; and generating a real-time audit signal or message each time a communication occurs or a connection is established between an end-user device and elements of the architecture to access SC system information comprising controlled unclassified information (CUI).

Such an exemplary method may further comprise (i) adding an indication or warning to retrieved SC system information to visibly indicate the SC system information is CUI, (ii) adding an indication to retrieved SC system information to visibly indicate at least an end-user name and communications address of the end-user device that has requested the retrieved CUI information; (iii) accessing an SC information storage sub-system configured as a centralized electronic repository of the SC system information; (iv) enabling the display of a plurality of SC System information as distinct images, where each image may represent a type SC System information; and (v) storing the SC System information as a structure that comprises multiple, end-user configurable hierarchical layers of information, where a first layer comprises a plurality of distinct images, where each image may represent a type SC System information and a second layer comprises a plurality of sets of information that, collectively, may be represented by one image in the first layer and a third layer that comprises sets of information from the second layer.

As with the inventive architectures, the SC system information involved in the inventive methods may comprise construction information, operational information, DTS information, permits, feasibility studies & related logs, historical and current cable routes, maps, MRS information, engineering information, cable plant information, maintenance information, cable fault information, as-built system installation information, personnel information, and audit trail information, for example.

DESCRIPTION OF THE DRAWINGS

FIG. 1 illustrates a simplified block diagram of an inventive architecture according to embodiments of the invention.

DETAILED DESCRIPTION

Exemplary embodiments of systems, devices and related methods for securely accessing and managing aggregated SC System information are described herein and are shown by way of example in the drawings. Throughout the following description and drawings, like reference numbers/characters refer to like elements.

Exemplary embodiments of systems, devices and related methods for securely accessing and managing aggregated SC System information, among other things, are described herein. Although specific exemplary embodiments are discussed herein, there is no intent to limit the scope of the present invention to such embodiments. To the contrary, the exemplary embodiments discussed herein are for illustrative purposes. Modified and alternative embodiments may be implemented without departing from the scope of the present invention. Said another way, the exemplary embodiments presented herein are only some of the many that fall within the scope of the present invention, it being practically impossible for the inventor to describe all the many possible exemplary embodiments and variations that fall within the scope of the present invention.

As used herein the phrase "cloud" means one or more (typically more) computers (sometimes called "servers") whose processing and information storage capabilities are combined and made available to users on demand without direct active management by a user (e.g., computers configured as a data center that offer processing and data storage to many users over the Internet). Physically, computers that are part of a cloud computing infrastructure may be co-located in the same geographical location, or may be located in different geographical locations. Further, a particular cloud computing architecture may be designed so that a particular function may be completed by more than one computer (i.e., may be distributed to multiple computers in different locations). As used herein the phrase "public cloud" means a cloud computing architecture whose processing and information storage capabilities are made available to many organizations (e.g. Microsoft's Azure platform or Amazon's AWS platform).

As used herein the phrase "real-time" means information that is communicated immediately after it is detected, collected or computed. As used herein the phrase "near real-time" means information that is communicated upon expiration of a small delay (typically less than a second) after it is detected, collected or computed due to the processing speed of the elements of an architecture involved in the communication or delays caused by a transmission medium/technique used for such a communication, for example.

It should be understood that when the description herein describes the use of a server (e.g., network, enterprise, applications, content), computer (e.g., desktop, laptop or other) or mobile device (e.g., smartphone, mobile phone, laptop, tablet) as an element, sub-system or device (collectively "elements") of an inventive architecture that such elements may include one or more physical components. For example, such elements may comprise one or more electronic processors and memories. The processors may be operable to access, retrieve and execute stored, specialized instructions for completing processes, features and functions of a system, sub-system or device described herein. Such instructions may be stored in an onboard memory, in separate memory, or in a specialized database for example. Such instructions represent processes, functions and features that have been integrated into memory as stored electronic signals.

It should be further understood that a set of such stored instructions may constitute steps in an inventive process or application, or used to complete an inventive function such steps and functions including, but not limited to, accessing, receiving, transmitting, generating, configuring, selecting, comparing, authenticating, detecting, retrieving, removing, replacing, inputting, outputting, initiating, computing, analyzing, displaying and storing to name just a few inventive functions that may be completed by executing such stored electronic instructions. Further, it should be understood that the word "access" or its tenses may be used to collectively describe one or more of the functions or steps just listed.

It should be understood that each of the embodiments of the systems, sub-systems, and devices described herein are configured with the necessary hardware components to enable each to process signals and information (e.g., data, content) much faster than humanly possible and to exchange signaling and information much faster than humanly possible. Each of the embodiments of the present invention cannot practically be implemented in any amount of time that would be acceptable to one skilled in the art using human beings as substitutes for the systems and devices described herein. For example, the embodiments described herein involve methods that securely access and manage SC System information in near real-time or real-time. Accordingly, the use of humans as substitutes for such methodologies is contrary to the objectives of the invention and does not result in the improvements provided by the invention because the inventive methodologies process signals and information many times faster than the human mind (within the time periods demanded by users of embodiments of the present invention and those skilled in the art of the present invention).

It should also be understood that one or more exemplary embodiments may be described as a process or method. Although a process/method may be described as sequential, such a process/method may be performed in parallel, concurrently or simultaneously. In addition, the order of each step within a process/method may be re-arranged. A process/method may be terminated when completed, and may also include additional steps not included in a description of the process/method.

As used herein, the word "user" is an individual that is operating or may operate a system or device, may communicate with a system/sub-system or device or make use of a related method. Similarly, the phrase "end-user device" means a device being capable of being used by an end-user. Examples of user devices are a desktop computer, laptop computer, tablet, smartphone, mobile phone, display, printer and their equivalents. The phrases "end-user" and "end-user device" as used herein may be used synonymously unless the context of the usage, or knowledge of those skilled in the art, dictates otherwise.

As used herein, the term "and/or" includes all combinations of one or more of the associated listed items. As used herein, the singular forms "a," "an" and "the" are intended to include the plural form, unless the context and/or common sense indicates otherwise. It should be further understood that the terms "comprises", "comprising", "includes" and/or "including", when used herein, specify the presence of stated features, systems, subsystems, steps, operations, elements, and/or components, but do not preclude the presence or addition of one or more other features, systems, sub-systems, steps, operations, elements, components, and/or combinations thereof unless the context or knowledge of those skilled in the art dictates otherwise.

As used herein the phrase "operable to" means "functions to".

As used herein the phrases "connection", "connected to", or similar phrases means an indirect or direct physical connection between at least two different elements of a system, device, or sub-system or means one element or part of a system, device, or sub-system is subsumed within (and thereby connected to) at least one other part of a system, device, subsystem or subassembly. When one element or component of a system, device, or sub-system is described or depicted as being connected to another component, other well-known elements used to facilitate such a connection may not be described or depicted because such elements are well known to those skilled in the art.

Yet further, when one element or component of a system, device, or sub-system is described or depicted as being connected to another element or component using "a connection" (or single line in a figure), it should be understood that practically speaking, such a connection (line) may comprise (and many times will comprise) more than one physical connection or logical channel, may be omni-directional or bi-directional, may include security allowances or dis-allowances, may or may not include separate data, formatting and signaling, and may be wireless or wired.

Still further, when one system, sub-system or device is described as communicating, or exchanging signals, with another system, sub-system (e.g., a network-based server) or device such communications and exchanges may include a web browser that is a part of an interface, and/or one or more "applications" (referred to herein as an "APP" or "APPs") that have been installed into, or downloaded onto, a system or device. An "APP" may include "content" (e.g., text, audio and video files), signaling and configuration files. For the sake of convenience and not limitation, the terms "APP" or "application" are used herein to refer to any application, but use of such a term also includes a reference to any file or data.

In one embodiment, an APP to be downloaded onto a user device may also reside or be stored on one or more hardware devices, such as a network or central or APP server in whole and/or in part, the latter indicating that the APP may be distributed among, and by, several devices (servers). An APP may be downloaded to a user device from an APP server (or servers) or have been otherwise provided and installed on such a server.

A given device may have a need to use a browser or use one or more APPs installed on a server. Accordingly, the embodiments described herein include protocols, necessary hardware, software and firmware resident on a user device for making use of a browser and/or transmitting and receiving an APP, content and/or content identification information relating to the APP from/to a server and vice-versa. Depending on the content to be transmitted, an APP may be installed directly on a device or may be downloaded from a server by initiating a request to a server to receive a local copy of the APP.

When a discussion herein describes the sending and reception of information or data (i.e., transmissions and receptions) from/to a sub-system or device to/from another sub-system or device, it should be understood that either a web browser and/or APP may be used to complete such transmissions and receptions depending, of course, on the context of the discussion.

It should further be understood that some of the systems, sub-systems and devices described herein (e.g., server) may include the ability for a third party or a user to access all, or some, of the functionality of such a system, sub-system and device described herein using, for example, an application programming interface (API), though it should be further understood that, in most cases, a user's access is restricted by the system or sub-system to their specific information. In general, an API is a set of subroutine definitions, protocols, and tools that some systems and devices described herein provide to enable users and third parties to build connections to the systems, sub-systems and devices described herein as well create their own software and applications. More particularly, some of the systems, sub-systems and devices described herein may provide APIs that are suitable for a web-based system, sub-system, operating system, database system, computer hardware, or software library. The API may include a specification, including, but not limited to, routines, data structures, object classes, variables, or remote calls.

It should be noted that the systems, devices and sub-systems illustrated in the figures are not drawn to scale, do not represent an actual shape or size and may not represent an actual system, device layout, or sub-system, manufacturer's drawing or visual. Rather, the systems, devices, and sub-systems are drawn to simply help explain the features, functions and processes of exemplary embodiments of the present invention described herein and covered by the claims set forth at the end of this description.

As used herein, the term "embodiment" or "exemplary" mean an example that falls within the scope of the invention(s).

Referring now to FIG. 1, there is depicted an exemplary, inventive architecture 1 for providing end users with the ability to securely access and manage aggregated SC System information. As shown, the architecture 1 may include an information management sub-system 2 (e.g., one or more application servers and databases in a public cloud environment), an SC information storage sub-system 3 (e.g., one or more secure, cloud-based content management servers and databases that may be, as required, complaint with NIST SP 800-171), an SC System administrative sub-system 4 (one or more specially programmed computers), one or more end-user devices 5 (desktops, laptops, mobile devices such as smartphones, mobile phones, laptops and tablets), a multi-factor authentication (MFA) sub-system 6, and a 24/7 remote data monitoring and protection sub-system 7 (e.g., a 24 hours, 7 days a week staffed Security Operations Center) (referred to as "SOC sub-system").

Turning first to the administrative sub-system 4, in one embodiment this sub-system may comprise one or more computers, for example, operable to function to complete one or more administrative functions as described further herein. Further, this sub-system 4 may be operable to exchange signalling and data communications (collectively "communications") with one or more end-user devices 5 in order to, among other things, receive SC System related information from an end-user via a secure communications connection 9, for example, where the connection 9 may be a wired or wireless telecommunications connection. It should be understood that each of the connections (i.e., connections 9 through 18) depicted in the associated figures/drawings and/or described herein between sub-systems and devices making up architecture 1 may be secure wired or wireless machine-to-machine connections, unless otherwise specified or unless the context and knowledge of those skilled in the art indicates otherwise.

In more detail, an end-user 5 that desires to make use of the architecture 1 to securely store, access and manage its SC System information may first exchange communications with the administrative sub-system 4 via an end-user's browser or APP that has been installed on the device 5 to create a basic account for services offered by the architecture 1. In embodiments, after a connection has been established between an end-user device 5 the sub-system 4 may be operable to generate, configure and store specific end-user administrative information (e.g., to open an account for services), including generating initial and subsequent end-user information access credentials (e.g., LOGIN, password) ("access credentials") in combination with additional MFA required user verification processes that allows an end-user to access stored SC System information. Upon generating the access credentials, the administrative sub-system 4 may transmit the so-generated access credentials to an end-user device 5 and to the information management sub-system 2 and MFA sub-system 6, for example.

In accordance with embodiments of the invention, after the end-user has received its access credentials, it may begin to transmit end-user specific information that the administrative sub-system 4 may use to create an administrative account (i.e., for billing purposes, etc.). Further, the credentials will also be used to eventually communicate with other elements of architecture 1. However, in accordance with embodiments of the invention described in more detail elsewhere herein, each time an end-user device 5 accesses the architecture 1, it must use the access credentials as a part of a multi-factor authentication process via subsystem 6. The inventors believe that the inventive architecture 1 described herein is the first architecture that enables (and requires) end-users to access, among other functions described herein, SC system information in compliance with both the NIST and US government regulations mentioned previously. The inventors note that the NIST and US government regulations mentioned previously include hundreds of technical requirements. Rather than list and discuss each of these requirements, for the sake of brevity the inventors state that the architecture 1 incorporates a substantial number of the technical requirements in order to be considered compliant.

For example, the end-user device 5 may desire to communicate its SC System information to the administrative sub-system 4, which in turn may forward the SC System information it receives from the end-user 5 to the information management sub-system 2 which in turn forwards the information to information storage sub-system 3. Alternatively, the administrative sub-system 4 may forward the SC System information it receives from the end-user 5 directly to sub-system 3.

In some cases, the end-user may by-pass the administrative sub-system 4 and transmit its SC System information in real-time to the the to the information management sub-system 2 which in turn forwards the information to information storage sub-system 3. In any of the above-scenarios, the SC System information that is sent from the end-user device 5 may ultimately be stored within information storage subsystem 3 in accordance with one or more user-tailored configurations, where such configurations may be stored within the information management sub-system 2.

The SC System information that is sent from the end-user device 5 to sub-systems 2, 4 may comprise, generally speaking, information formatted as text, images, audio files, video files, computer-aided design (CAD) drawings or measurement data, for example.

In all cases, however, before SC System information is communicated from an end-user device 5 to an element of the architecture 1, a secure connection must be established using the above-mentioned access credentials as part of a multi-factor authentication process that complies with the NIST and US government regulations mentioned elsewhere herein.

In embodiments of the invention, a secure communication connection between the end-user 5 and elements of architecture 1 may be generated by MFA sub-system 6. For example, the end-user may first input the access credentials using a browser or APP into device 5 which transmits the credentials to MFA sub-system 6. Upon receiving the credentials, sub-system 6 may be operable to compare the credentials with authorized end-user credentials stored in its memory (or stored within memory of the administrative sub-system 2). If the comparison results in a match, the MFA sub-system 6 may be further operable to generate a temporary communications connection with the end-user device 5. Thereafter, the sub-system 6 may be operable to generate a number (e.g., a multi-digit, pseudo-randomly generated number) and transmit such a number to another end-user device other than device 5 (or to device 5) using a different communications connection as an email, text message, and/or using an additional authentication APP (e.g., an APP that generates a new number/code every few seconds) and/or an audio message, for example. Upon receiving the number, the user may input the number into the device 5, whereupon the number is transmitted back to the sub-system 6 via the temporary communications connection. Upon receipt of the number, the sub-system 6 may be operable to compare the number to the number it previously generated. If the comparison results in match then the MFA sub-system 6 may be operable to convert the temporary communication connection to a secure, MFA communications connection. Once such a secure, MFA connection is established, the end-user device 5 may successfully communicate with other elements of architecture 1, transmit SC System information to other elements of architecture 1, receive stored, SC System information or additional communications (e.g., instructions) from such elements or access and manage aggregated stored, SC System information.

In addition to requiring MFA authentication for all end-user communications with elements of architecture 1 involving the exchange of, transfer of, or access (collectively "access") to aggregated, SC System information when full compliance with the NIST and US government regulations mentioned herein is required, the inventive architecture 1 and related methods additionally require the generation of real-time communication audit signal or indicators, typically referred to as "audit logs" (i.e., reports) for all end-user communications with elements of architecture 1. Accordingly, the inventors believe that the inventive architecture illustrated by the description herein is the first architecture to simultaneously, substantially at the time of each end-user communication with architecture 1, provide: (1) MFA authentication (i.e., requires and enables end-users to complete MFA authentication) in full compliance with NIST and US government regulations in order to access aggregated, SC System information and (2) requires and generates real-time audit logs that are retrieved on schedule and interrogated.

In an embodiment of the invention, the so-generated audit logs are not typically disclosed to the end user of devices 5 and are reviewed and processed by the administrative sub-system 4 and/or SOC sub-system 7 for action. Thereafter, necessary actions may be taken against a non-authorized user or malicious authorized users. These features ensure the ultimate and thorough authenticity of the audit signals and data that is generated and collected. One reason why audit logs may not (typically) be disclosed to an end-user is that an end user, may, if notified of such audit logs, knowingly attempt to falsify or alter their credentials in order to try to bypass the security features of architecture 1. Further, in embodiments of the invention, the audit logs may include certain identifiers, such as IP addresses and other user details. Accordingly, the audit logs disclose all user activity data as it occurs (e.g., time, location (IP address), username, email, or other identifier, etc., and nature of activity) and may be detected and stored by a sub-system of architecture 1 (e.g., sub-systems 2, 3 and 6) in real-time Notwithstanding the above, in an alternative embodiment the audit logs, either partially or fully, may be disclosed to a designated administrator of an end-user in the course of offering a service provided by architecture 1, but presently the inventors believe that such an occurrence would not be typical.

The generation of audit logs may be completed in a number of different ways. In one embodiment, each time a communication or connection occurs or is established between an end-user device 5 and elements of architecture 1, and each time a message is sent from, or to, an end-user device 5 to/from elements of architecture 1, the element involved in the communication or message (e.g., sub-systems 2, 3 and 6) may log and store an indication of such activity in memory (e.g., in a "system audit log"). In embodiments, the stored audit logs may, thereafter, be accessed by, or sent to, the SOC sub-system 7 and/or administrative sub-system 4 for further analysis and action. The generated audit logs represent a detailed, historic view of substantially all of the communications between and end user and a subsystem of architecture 1 as well as the usage and actions that were completed by an end-user while communicating with sub-systems within architecture 1. In embodiments of the invention, sub-systems 4,7 may routinely exchange communications regarding the so generated audit logs and their associated signals/messages as a part of their monitoring and access control functions.

In addition to the generation of audit logs, sub-systems of the inventive architecture 1 may be operable to complete additional electronic security processes. For example, sub-system 2 may be operable to execute stored instructions that comprise an antivirus process to detect and block electronic viruses originating from within, from an end-user device 5 or another sub-system (e.g., administrative sub-system 4) from accessing sub-system 2 and sub-system 3 (and the SC System information stored therein). Sub-system 2 may further execute stored instructions from its memory to monitor the operation of its processors (e.g., central processing units) and file structures to ensure that no intrusive or malicious signals can compromise its operation and corrupt or access any SC System information. In an embodiment, SOC sub-system 7 and/or administrative sub-system 4 may receive the audit logs, analyse their content and, if necessary, may generate one or more alert messages or temporarily suspend user or client access for evaluation if the analysis determines that intrusive or malicious signals or activity have been detected, for example.

Referring back to the generation and analysis of audit logs, the administrative sub-system 4 and/or SOC sub-system 7 may be operable to analyse each audit message and/or the generated audit logs in real-time or near-real-time to determine the presence or absence of violations, anomalies or suspicious activity by executing one or more analytical processes stored as electronic signals/instructions in memory. Some examples of suspicious activity that may be detected by subsystems 4,7 include but are not limited to: access control violations by end-users, access control violations within architecture 1, the CPU and virus issues mentioned previously, the number of users per account, excessive downloading or printing of data within architecture 1 and excessive number of (or time period of) end-user accesses.

In an embodiment, if the administrative sub-system 4 and/or SOC sub-system 7 determine that a violation, anomaly or suspicious activity has occurred then administrative sub-system 4 and/or SOC sub-system 7 may be operable to terminate the communication or message that is associated with the so-determined violation, anomaly or suspicious activity in real-time or near-real time and/or prohibit or otherwise restrict any further access, communications or messages between the end-user 5 and the element of the architecture 1 that is involved in the communication, for example (e.g., by adding the suspicious end-user who is pretending to be a legitimate end-user, and/or an associated message (email address) to a black-list), among other actions that such elements may take. In addition, sub-systems of architecture 1 (e.g., sub-systems 2 through 4) may be operable to monitor, detect and prevent signals that originate from sources that are external to those considered permissible, end user devices 5 (or end-users) from accessing architecture 1; such signals include, but are not limited to, signals that comprise "brute force" attacks, "DDos" attacks, and other malicious signals from devices and individuals who attempt to access the architecture 1 using malicious software, or by directing continuous login attempts (using possible username and password combinations in an attempt to login). Such attacks seek to deplete and/or overload resources of sub-systems of architecture 1 in order to prevent the proper operation of the sub-systems and/or connections in between sub-systems of architecture 1.

Related to the generation of audit logs is the handling of Controlled Unclassified Information (CUI). US government regulations require that all SC systems handling CUI must track such communications and mark information involved in such communications (e.g., documents, emails, or other electronic transmissions) as CUI information. Further, these regulations require that the uses involved in communicating CUI be provided with a warning that they are accessing and communicating CUI.

In many cases, SC System information may be classified as CUI information. Accordingly, embodiments of the invention described elsewhere herein provide for the required handling CUI information.

Backtracking somewhat, as was mentioned previously an end-user device 5 may transmit SC System information to the administrative sub-system 4 rather than send it to the information management sub-system 2 (e.g., the cloud-based servers). In such a case, similar to communications between an end-user 5 and an element of architecture 1, communications or messages exchanged between the administrative sub-system 4 and another element of architecture 1 (e.g., sub-systems 2 and 3-7) are required to undergo a similar MFA authentication process and involve the similar generation of audit messages and logs as discussed previously above. This insures that SC System information that is originally sent from an end-user 5 to architecture 1 via subsystem 4 is handled with a similar level of security as if the SC System information was sent directly to the information management sub-system 2, for example.

Prior to discussing how an end-user accesses stored, aggregated SC System information relating to a specific submarine cable system, we first discuss additional functions and features of the administrative sub-system 4.

For example, the administrative sub-system 4 may generate a plurality of mandatory and/or optional, information management configurations or templates (collectively "configurations") and exchange these configurations with an end user's device 5 (or allow the end user device 5 to access the configurations), where each configuration comprises different functionality that permits an end-user to determine how its SC System information, such as documents, images, data, etc., may be organized (e.g., creating a folder/subfolder organization), stored, accessed, retrieved, managed and/or displayed.

This may, typically, occur during the time period an end-user device 5 first communicates with administrative sub-system 4 (i.e., during the initialization of services/creation of an account with architecture 1), though it should be further noted that in other embodiments the configurations can be updated, revised, deleted, etc., at any time after an account for services offered by the architecture 1 has been created, provided the end-user maintains such an account and complies with the secure communication features required by the inventive architecture 1.

In addition to, or as part of, an information management configuration, the sub-system 4 may be operable to exchange communications with an end-user device 5 (e.g., one used by a designated administrator of an end-user) in order to determine those individuals of a given end-user that an end-user desires to grant access to its SC System information. In various embodiments of the invention, the sub-system 4 may receive from the end-user device 5 a listing of personnel/individuals that may access a given end-user's SC System information based on such exchanges. Further, the sub-system 4 may generate and store a listing of the types of SC System information that a specific individual or individuals may (or may not) access in order to restrict or limit access to certain SC System information to certain individuals/personnel, for example (sometimes referred to as "permissions"). For example, an end-user may designate one or more individuals as "administrators" and further grant them access to all, or substantially all of that clients their particular stored SC System information as well as provide such individuals with the ability to add or subtract individuals that may access SC System information or change the amount of information an individual(s) may access (i.e., change the tiers, permissions within their system). The inventors believe that by providing end-users with such tiered, access control enables an end-user (e.g., personnel aboard a cable laying ship/vessel) with the ability to allow a wide range of personnel to access only that information which is relevant to their duties and responsibilities, while not compromising the security of other information.

The so-generated listings may be stored by sub-system 4 and, thereafter, used by sub-system 4 or other elements of architecture 1 (e.g., sub-system 2) to grant or deny a given individual or individuals access to certain stored SC System information, for example. It should be understood that those individuals who are allowed to access stored SC System information are limited to information that relates to a specific SC System. Said another way, the architecture 1 may store information that relates to a plurality of different SC Systems. Accordingly, in embodiments of the invention sub-systems of architecture 1 only allow end-user devices 5 to access information of a given SC System that is owned, operated or under construction by associated employers/contractors of the end-users 5. Said another way, an end-user device 5 will not be granted access (authorized) to information about all of the SC System stored within architecture 1. Instead, a given group of end user devices 5 will only be permitted to access certain SC System information. This process may be referred to herein as a part of a process of providing tiered levels of access to SC System information.

Again, the functions and processes just described may be completed by the administrative sub-system 4 upon initial configuration of aggregated SC System information (i.e., upon initially setting up an account) as well as after the initial configuration. In the event that the administrative sub-system 4 is configured as an "end-user", then the sub-system 4 may be operable to access the administrative information for all SC System, but not the underlying proprietary SC System information of such systems. Still further, in an alternative embodiment, when the administrative sub-system 4 is configured as an "end-user", the sub-system 4 may be operable to access both the administrative information and underlying proprietary SC System information for all SC System. In all of the above scenarios, the communications between sub-system 4 and other elements of architecture 1 are subject to the MFA authentication processes described herein as well as the generation of audit signals and logs and analysis described herein.

Referring back to the configurations exchanged between an end-user device 5 and the administrative sub-system 4, after such configurations have been exchanged with the end-user device 5 or have otherwise been accessed by the end user device 5, a modified configuration may be created by the end-user through the end-user's selection of, and/or activation of, certain functionality within a configuration. The resulting modified configuration is tailored to the requirements of a specific submarine cable system. Thereafter, the administrative sub-system 4 may store the modified configuration and send the modified configuration to the information management sub-system 2 after completing an MFA authentication process so it can be further stored and referred to later on.

In an embodiment, after receiving the modified configuration (including the listings) the administrative sub-system 4 and/or information management sub-system 2 may be operable to exchange (APIs and other instructions with the information storage sub-system 3 in order to electronically configure the sub-system 3 in accordance with the modified configuration. For example, sub-systems 2,4 may instruct sub-system 3 to electronically configure its memory (databases) in order to match the functionality selected by the end-user as a part of the modified configuration. Yet further, sub-systems 2,4 may instruct sub-system 3 to electronically configure its operation to match the way the end-user desires its information should be organized, stored, accessed, retrieved, managed and/or displayed.

At some point an end-user may desire to access SC System information that has been stored within elements of architecture 1 (e.g., within sub-systems 2,3). To do so, the end-user and its associated device 5 must complete the MFA authentication process described elsewhere herein (see the discussion involving sub-system 6). It should be noted that if an end-user device 5 decides to access stored SC System information via subsystem 4, then, sub-system 4 in turn must complete a similar MFA authentication process as described elsewhere herein.

In either case, sub-system 2 functions as a gatekeeper between an end-user device 5 and SC System information stored in sub-system 2 and sub-system 3. That is to say, whether or not an end-user device 5 seeks to access SC System information using administrative sub-system 4 or seeks access directly from sub-system 2, any request to access SC System information will be transmitted to sub-system 2 for processing and analysis after an appropriate MFA authentication process (see the discussion involving sub-system 6, described elsewhere herein) with sub-system 3 has been completed.

In an embodiment, the information management sub-system 2 may comprise one or more application servers, for example, that operate in conjunction with one or more databases, for example, that may be securely operated by a third party, such as Microsoft Corporation (e.g., Azure servers), Amazon Web Services (AWS), for example. Sub-system 2 may be operable to encrypt or otherwise electronically protect information (or signalling) it receives from, or transmits to, an end-user device 5 as well as from/to other elements of architecture 1.

In one embodiment, upon receiving a request to access stored SC System information from a user device 5, the sub-system 2 may be operable to generate one or more APIs. Thereafter, the APIs may be directed at information storage sub-system 3, for example, where the SC System information for a specific submarine cable system may be stored. In accordance with a particular API and modified configuration, stored SC System information may be retrieved from the sub-system 3 by sub-system 2 and then transmitted to the end user device 5. Alternatively, APIs may direct sub-system 3 to alter, delete, treat (e.g., with additional indicators when the information is CUI information, for example, described elsewhere herein), download, add, receive or upload information (e.g., files, images) and generate notifications for specific end-users, for example. Many different types of APIs may be generated by sub-system 2 and sent to sub-system 3, where one or more APIs are based on instructions received by sub-system 2 from end-user device 5 (or administrative sub-system 4).

As previously noted, stored SC System information may sometimes comprise CUI. In embodiments of the invention, if SC System information comprises CUI and an end-user requests that such information be transmitted to him/her, then the sub-system 2 (or another element of architecture 1, such as sub-system 3) is operable to add an indication or warning to the retrieved information that visibly indicates the information is CUI prior to transmission to the end-user device 5. (e.g., a colored "banner" may be added to a retrieved document, and/or a check mark or a checked box may appear with an image, folder or sub-folder, i.e., the banner and/or check/checked box is visible in an end-user's and/or the SC sub-system viewing screen) in accordance with the US government requirements previously mentioned. In addition, or alternatively, if CUI is output from sub-system 2 to an end-user device 5 (i.e., downloaded to, and then printed from an end-user device 5) the subs-system 2 (or another element of architecture 1) may be operable to add an indication (e.g., an identifying watermark) to the retrieved information prior to its output that indicates the name and communications address (email) of the end-user device and end-user that has requested to receive the CUI information. The addition of the name and communications address of the end-user that has requested and retrieved the SC System information is believed to deter impermissible information breeches of the architecture 1 and, is one example, among many, of how the inventive architecture 1 complies with the CUI requirements. Said another way, in addition to the functions described above, the inventive sub-system 2 (or administrative sub-system 4) may be operable to complete other functions that are required by US government regulations governing CUI.

For example, the sub-system 2 may provide instructions to the information storage sub-system 3 that directs the sub-system 3 (or another element of architecture 1) to store CUI in a specialized configuration (sometimes referred to as a "CUI drawer"). In addition, access to CUI requires the generation of audit messages and audit logs similar to those described previously. Accordingly, in embodiments, each time CUI is accessed, altered, retrieved, removed, or replaced, etc. (collectively "accessed") from sub-system 3 (or another element of architecture 1) an audit signal or message as described previously herein is generated and sent to the administrative sub-system 4 and/or SOC sub-system 7, for example. In sum, the present invention provides a full audit trail of CUI that is accessed by an end-user device 5.

In addition, yet another embodiment, an end-user may send a physical digital storage device (e.g., electronic thumb drive) containing CUI information to the administrator of sub-system 4. In accordance with an embodiment of the present invention, the administrator follows the procedures set forth in the previously mentioned NIST requirements to label each storage device with appropriate CUI markings, store the device in a segregated CUI lockable drawer, and physically sign their name and other relevant identifiable details to a physical sign-in/out sheet. Thereafter, the administrator may upload the CUI information contained on the device to the sub-system 4 CUI according to NIST SP 800-171 methods and procedures mentioned previously herein.

The inventors believe that the inventive architecture illustrated by the description herein is the first architecture that allows end-users to store, send, retrieve and otherwise access SC System information while providing full compliance with NIST SP 800-171 and CUI audit requirements.

We now turn to a discussion of the information storage sub-system 3. In an embodiment, information sub-systems provided by the invention, such as sub-system 3 (or the combination of sub-systems 2 and 3) comprise a centralized electronic repository of user specific, organized and aggregated submarine cable information that may be accessed, among other things, by end-user devices 5 as described elsewhere herein. By "aggregated" is meant that substantially all information related to a submarine cable system may be accessed by an end-user in real-time or near real time by accessing sub-system 3. Such information, includes, but is not limited to the following: construction information, operational information, DTS information, permits (US, foreign countries, oil, gas and other utilities), feasibility studies & related logs, historical and current cable routes, maps, MRS information, engineering information, including, but not limited to, RPLs and SLDs, cable plant information, maintenance information, cable fault information, as-built system installation information, personnel information, and audit trail information.

In an embodiment, a number of different types of user specific, organized and aggregated, SC System information may be accessed, retrieved and then displayed on an end-user device 5 on a single screen or within a single electronic window. For example, the architecture 1 (e.g., sub-systems 2 through 4) may be configured to enable design plans, permits, technical specifications, plant, testing & acceptance, images, video, sound, CAD data, operational, maintenance and emergency information to be presented on a single screen. Further, a complete history of each revision to a set of information (e.g., a document) may be retrieved by end-user device 5 including, but not limited to, the revisions made, an identification of the device 5 that originated the revisions and the associated user (e.g., username, email address, IP, date of changes, etc.), as well as earlier versions of the information. Conversely, it should be understood that one or more elements of the architecture 1 (sub-systems 2, 3 and 4) may be operable to store each revision that an end-user makes to a set of information, as well as a complete history of each revision to a set of information, including, but not limited to, the revisions made, an identification of the device 5 that originated the revisions and the associated user (e.g., username, email address, IP, date of changes, etc.), as well as earlier versions of the information and enable retrieval of all of the above information by an end-user for display on (or output to) an end-user device 5.

As noted above, sub-system 3 organizes and aggregates SC System information so that a plurality of SC System information can be displayed on a single screen or within a single electronic "window". In one embodiment, the plurality of SC System information may be displayed as a plurality of distinct images, where each image may represent a type of associated, SC System information. Some exemplary types of information are: construction information, operational information, maintenance information, DTS information (e.g., technical research, environmental factors, system cost projections, installation liabilities, detailed nautical and bathymetric maps, charts, site survey reports, geological information, spreadsheets, photographs, videos and other information that will be needed for the life span of the cable), permits (US, foreign countries, oil, gas and other utilities), feasibility studies & related logs, historical and current cable routes, maps, MRS information, engineering information, including, but not limited to, RPLs and SLDs, cable plant information, maintenance information, cable fault information, as-built system installation information, personnel information, and audit trail information.

In an embodiment, the sub-system 3 may store instructions in memory that, when executed enable sub-system 3 to be configured to store SC System information as a structure that comprises multiple, hierarchical layers of information, where the images may form a first layer, and where a second layer may comprise a plurality of sets of information (e.g., folders) that, collectively, may be represented by one image in the first layer. For example, 10 sets of information (10 folders) of a second layer may collectively be represented by one image in the first layer.

The sub-system 3 may be further configured into additional layers, such as a third layer that divides the second layer's sets of information into smaller sets of information (e.g., sub-folders, files, images, documents). In an embodiment, the number of layers and content of each layer may be configured by the end-user via input into administrative sub-system 4 and/or sub-system 2 (i.e., the modified configuration discussed previously).

As also mentioned previously SC System information may comprise CUI. Accordingly, sub-system 3 may be configured (using stored instructions) to electronically "tag" and store information that is CUI such that when the tagged CUI is accessed and displayed to the end-user by sub-system 2 (or another element of architecture 1) as represented by an image, folder or sub-folder representing the accessed CUI an indicator (e.g., colored banner) is also displayed adjacent (for example) the image, folder or sub-folder. Further, if an end-user desires to print out such tagged CUI information then sub-system 2 (or another element within architecture 1) is operable to generate an indicator (watermark) that comprises specific identifiers to indicate, for example, the end-user who downloaded and/or printed the CUI.

In addition to having the capability of providing an end-user with the ability to access all their stored SC System information from a multi-level hierarchy in real-time, embodiments of the invention also provide an end-user with the ability to locate specific SC System information using key word and other advanced search filters and logical operators. For example, an end-user (via device 5) may input key words, and/or key word combinations, i.e. using "and," "or," "with", to conduct a search of stored SC System information. In addition, users may search by geographic terms, including but not limited to latitude, longitude, and ocean depth information. The inventors believe that the ability to conduct searches of SC System information using latitude, longitude, and ocean depth information is unique because such a search requires a sub-system of the architecture 1 (e.g., sub-system 2) to compute a location based on latitude, longitude and ocean depth information.

Additionally, end-users are able to edit groups/batches of documents simultaneously (e.g., a global search and replace function to change the name of a cable system in all documents in one action).

The inventors believe that the inventive architecture illustrated by the description herein is the first architecture that stores substantially all submarine cable information in a multi-level, aggregated fashion and, as required, allows real-time or near real-time access to such information through architecture wide, NIST and CUI compliant communications.

It should be understood that the foregoing description only describes a few of the many possible embodiments that fall within the scope of the inventions. For example, though the embodiments set forth herein focus on the applicability of the inventive methods, systems and devices in submarine cable systems, it should be understood that one or more of the inventive systems, devices and methods may also be combined with knowledge of those skilled in the art and applied to terrestrial power cable systems, "smart" cable systems for monitoring and other applications, terrestrial communications systems, and wireless communication systems that may be used in conjunction, or in combination with, with a submarine cable system, for example.

In sum, numerous changes and modifications to the embodiments disclosed herein may be made without departing from the general spirit of the invention, the scope of which is better defined by the claims that follow.

We claim:

1. An architecture for providing end users with the ability to securely access and manage aggregated cable system information, comprising:
    an information management sub-system;
    a cable information storage sub-system configured to allow display of a plurality of cable system information as distinct images, where each image may represent a type of cable system information, and wherein the information management sub-system and the cable information storage sub-system are further operable to generate an audit signal or message each time a communication occurs or a connection is established between an end-user device and the information management sub-system and the cable information storage sub-system, respectively;
    a multi-factor authentication (MFA) sub-system operable to enable completion of multi-factor authentication compliant with at least United States Government MFA standards, regulations and certifications that comprise at least Defense Federal Acquisition Regulation requirements to access the aggregated, system information; and
    a remote data monitoring and protection sub-system.

2. The architecture as in claim 1 further comprising a cable system administrative sub-system.

3. The architecture as in claim 1 further comprising one or more end-user devices.

4. The architecture in claim 1, wherein the remote data monitoring and protection sub-system comprises a 24 x7 security operations center.

5. The architecture as in claim 1 wherein the cable system information storage sub-system comprises a centralized electronic repository of the cable system information.

6. The architecture as in claim 5 wherein the cable system information comprises construction information, operational information, feasibility studies & related logs, historical and current cable routes, maps, marine route survey, maintenance information, and as-built system installation information.

7. The architecture as in claim 5 wherein the cable system information comprises topographical study information, desk top study permits, engineering information, cable plant information, cable fault information and end-user audit trail information.

8. The architecture as in claim 1 wherein the cable system information storage sub-system is configured as a structure that comprises multiple, end-user configurable hierarchical layers of information, where a first layer comprises a plurality of distinct images, where each image may represent a type of cable system information, a second layer comprises a plurality of sets of information that, collectively, may be represented by one image in the first layer and a third layer comprises divided sets of information from the second layer.

9. A method for providing end users with the ability to securely access and manage aggregated cable system information, comprising:
    enabling completion of multi-factor authentication compliant with at least United States Government MFA standards, regulations and certifications that comprise at least Defense Federal Acquisition Regulation requirements to access aggregated, cable system information stored within an architecture;
    generating an audit signal or message each time a communication occurs or a connection is established between an end-user device and elements of the architecture to access the cable system information; and
    enabling the display of a plurality of the cable system information as distinct images, where each image may represent a type of cable system information.

10. The method as in claim 9 further comprising adding an indication or warning to retrieved cable system information to visibly indicate the retrieved cable system information is Controlled Unclassified Information (CUI).

11. The method as in claim 10 further comprising adding an indication to the retrieved cable system information to visibly indicate at least an end-user name and communications address of the end-user device that has requested the CUI.

12. The method as in claim 9 further comprising accessing a cable information storage sub-system configured as a centralized electronic repository of the cable system information.

13. The method as in claim 12 wherein the cable system information comprises construction information, operational information, permits, feasibility studies & related logs, historical and current cable routes, maps, maintenance information, and as-built system installation information.

14. The method as in claim 12 wherein the cable system information comprises topographical study information, desk top study permits, engineering information, cable plant information, cable fault information and end-user audit trail information.

15. The method as in claim 9 further comprising storing the cable system information as a structure that comprises multiple, end-user configurable hierarchical layers of information, where a first layer comprises a plurality of distinct images, where each image may represent a type of cable system information and a second layer comprises a plurality of sets of information that, collectively, may be represented by one image in the first layer and a third layer that comprises sets of information from the second layer.

16. An architecture for providing end users with the ability to securely access and manage aggregated cable system information, comprising:

an information management sub-system;

a cable information storage sub-system configured to allow display of a plurality of cable system information as distinct images, where each image may represent a type of cable system information, and wherein the information management sub-system and the cable system information storage sub-system are further operable to generate an audit signal or message each time a communication occurs or a connection is established between an end-user device and the information management sub-system and the cable information storage sub-system, respectively; and a multi-factor authentication (MFA) sub-system operable to enable completion of multi-factor authentication compliant with at least United States Government MFA standards, regulations and certifications that comprise at least Defense Federal Acquisition Regulation requirements to access aggregated, cable system information stored within an architecture.

17. The architecture in claim 16 further comprising cable system administrative sub-system.

18. The architecture in claim 16 further comprising a remote data monitoring and protection sub-system.

19. The architecture in claim 18, wherein the remote data monitoring and protection sub-system comprises a 24 x7 security operations center.

20. The architecture as in claim 16 further comprising one or more end-user devices.

* * * * *